2 Sheets--Sheet 1.
J. S. SNIVELY.
Wheel-Harrow.
No. 167,703.                                            Patented Sept. 14, 1875.
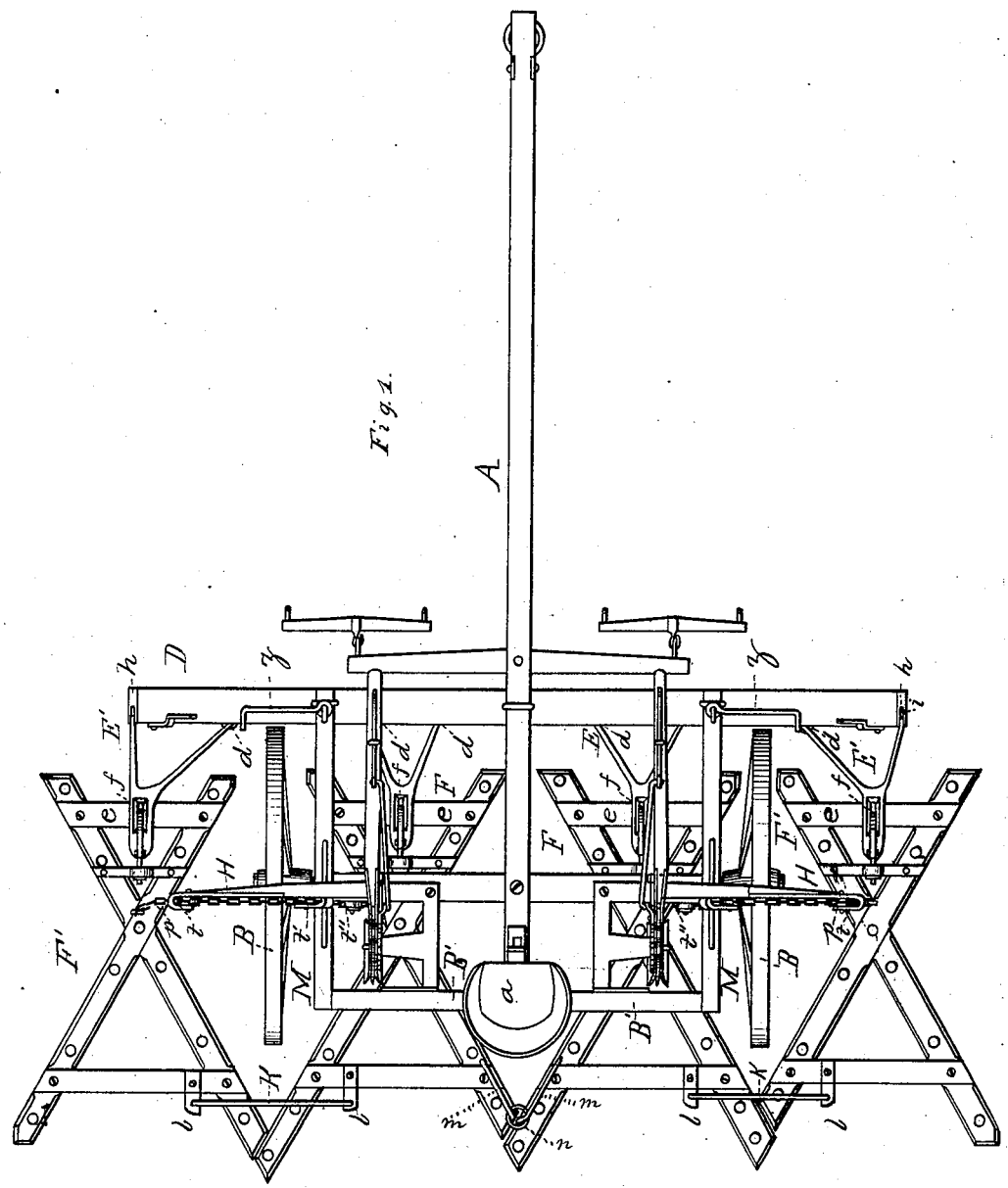

2 Sheets--Sheet 2.
J. S. SNIVELY.
Wheel-Harrow.
No. 167,703. Patented Sept. 14, 1875.
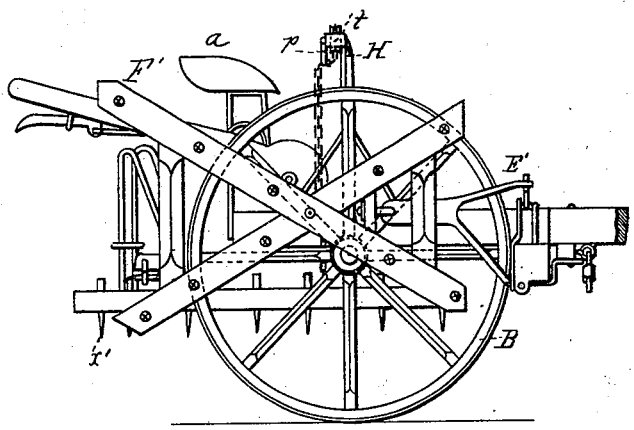
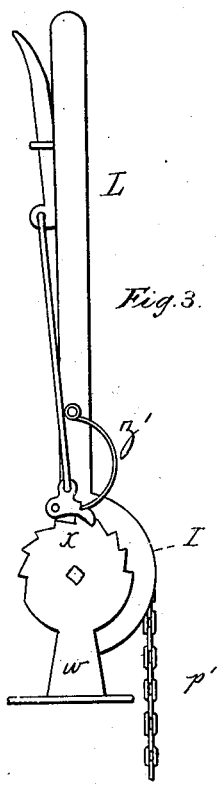
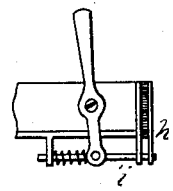
Witnesses.
Chas O Gill
Edwd C. Ford.
Inventor.
J Stouffer Snively
by his attys
Cox + Cox

UNITED STATES PATENT OFFICE.

J. STOUFFER SNIVELY, OF GREENCASTLE, PENNSYLVANIA.

IMPROVEMENT IN WHEEL-HARROWS.

Specification forming part of Letters Patent No. 167,703, dated September 14, 1875; application filed July 3, 1875.

*To all whom it may concern:*

Be it known that I, J. STOUFFER SNIVELY, of Greencastle, Pennsylvania, have invented new and useful Improvements in Riding-Harrows, of which the following is a specification, reference being had to the accompanying drawings.

The invention relates to an improved harrow, as more particularly described hereinafter; and is devised with the object of operating upon a great breadth of surface, as well as affording a device that can be worked in sections, if desired, and easily transported.

Figure 1 is a top or plan view of a device embodying the elements of the invention. Fig. 2 is a side elevation of same. Fig. 3 is a detached view of the lever L. Fig. 4 is a similar view of the end of the bar D.

In the accompanying drawings, A represents the tongue or traction device, which is secured below the driver's seat *a* at the center of the frame B, provided on each side with conveying-wheels B. Across the front of the device and properly secured to the frame extends the bar D, provided at equal intervals with the plates *b*, having the ears *d* to receive the rods which pivot the front upper ends of the yokes E to the bar, the lower rear end of the yokes being hinged about the center of the harrow-frames F, the front cross-bar *e* of which is furnished with the segmental guide *f*, which passes through a slot, *x'*, in the yoke E, and is furnished at its upper end with a stud to prevent the escape of the guide. The slot *x'* is wider above than below, so as to allow for the lateral play of the guide when passing over uneven ground. The frames are attached so as to move below and in rear of the bar D, one on each side of each wheel. The yokes E', beyond the wheels, are secured to the bar D, in such a manner as to rotate vertically, and provided with a spring-bolt, *h*, which passes through the slot *i* on the end of the bar, between which the free end of the yoke enters, and may be secured therein by the operation of the bolt *h*, which being withdrawn, the frame may be turned vertically and secured in that position above the ground by a hook, *z*, on the ends of the davits, hereinafter mentioned, which receives a loop in the chain which operates the outer frames. The rear ends of the outside and adjacent frames are connected by a loose rod, *k*, which is hinged in the ears or loops *l*. The inner frames are connected by the staples *m* and a ring, *n*, which, while securing them in close relation, permits the independent elevation of either one. Upon each side of the driver's seat are placed the standards or davits H, which extend upward and outward, their outer ends being directly over the center of the frames beyond the wheels, with the center of which they are connected by the chain or cord, *p*, which passes through the loop *t* in the end of the davit; thence over the pulley-wheel *v* inward through the loop *t'* and over the pulley-wheel *v'*; thence downward through the loop *t''* and over the pulley-wheel *v''* secured to the axle of the frame B; thence upward and through the double segmental receiver I, the other end of the chain being secured near the base of the lever L. The receiver I is attached to the standard *w*, placed at the center of the frame M, which is secured to the frame B adjacent the driver's seat, the upper end of the standard being expanded, so as to form the circular ratchet *x*, at the center and on the outside of which is pivoted the center of the receiver I, to the upper rear part or corner of which is rigidly secured the lower end of the lever L, provided with the spring-pawl *z'*, arranged to engage the ratchet as the lever is pressed forward by the tension of the chain. A second chain, *p'*, extends from the base of the lever through the inner channel of the receiver downward, and is secured to the center of the harrow-frame inside of the wheels. The harrow-teeth *x'* are arranged in such manner that no two shall follow in the same line. Thus every portion of the surface may be operated upon.

It is obvious that any one or more of the harrow-frames F may be elevated or lowered at will by operating the levers L; that the frames beyond the wheels can be elevated clear of contact, thus permitting the use of only those between the wheels; or that either the frame within and outside of the wheel on one side can be used without using the other pair of frames.

The peculiar arrangement of the teeth enables the device to very thoroughly operate upon all the surface traversed.

What I claim as my invention, and desire to secure by Letters Patent, is—

1. A wheel-harrow having frames completely outside of the wheels, substantially as set forth.

2. A wheel-harrow having one or more frame or frames between and one or more frame or frames outside of the wheels, substantially as expressed.

3. A wheel-harrow, the frames of which are arranged in sets, one frame of each set being outside of, and the other frame of the same set inside of, the wheel, substantially as set forth.

4. A wheel-harrow having frames arranged in sets, one frame outside of, the other inside of, the wheel, and connected as stated, so that any set or any frame may be operated and does operate independently of any other set or frame, substantially as set forth.

5. The yokes E, having their front ends pivoted to the bar D, and their rear ends hinged to the harrow-frames F, substantially as stated.

6. The end yokes E', having their front ends pivoted to the bar D, as specified, and provided with the spring-bolt $h$, all so as to permit the suspension of the frame in a vertical position, substantially as set forth.

7. The segmental cog-guide $f$, for the uses set forth.

8. The slot $x'$, for the uses and purposes substantially as set forth.

In testimony that I claim the foregoing improvements in riding-harrows, as above described, I have hereunto set my hand and seal this 24th day of June, 1875.

J. STOUFFER SNIVELY. [L. S.]

Witnesses:
A. R. FLEMING,
WM. F. PATTON.